(12) United States Patent
Dick et al.

(10) Patent No.: US 6,771,632 B2
(45) Date of Patent: Aug. 3, 2004

(54) SUB-CHANNELS FOR THE RANDOM ACCESS CHANNEL IN TIME DIVISION DUPLEX

(75) Inventors: Stephen G. Dick, Nesconset, NY (US); Ana Lucia Iacono, Garden City, NY (US); Janet Stern-Berkowitz, Little Neck, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 156 days.

(21) Appl. No.: 10/020,725

(22) Filed: Dec. 12, 2001

(65) Prior Publication Data

US 2002/0075839 A1 Jun. 20, 2002

Related U.S. Application Data

(60) Provisional application No. 60/256,621, filed on Dec. 19, 2000.

(51) Int. Cl.[7] ............................................... H04B 7/216
(52) U.S. Cl. ........................ 370/342; 370/342; 370/441
(58) Field of Search ................................. 370/280, 276, 370/335, 337, 347, 441, 442, 342, 310; 375/200

(56) References Cited

U.S. PATENT DOCUMENTS 5,822,359 A  * 10/1998 Bruckert et al. ............ 375/200

6,031,832 A     2/2000 Turina
6,400,695 B1 *  6/2002 Chuah et al. ................ 370/310
6,584,087 B1    6/2003 Czaja et al.
6,594,240 B1    7/2003 Chuah et al.

FOREIGN PATENT DOCUMENTS

EP        0994634      10/1999

OTHER PUBLICATIONS

Authored by ETSI, Universal Mobile Telecommunications System (UMTS); Physical layer procedures (FDD) (#GPP TS 25.214 version 3.4.0 Release 1999), published by ETSI, pp. 1–47 .*
Chuah et al., "Access Priority Schemes in UMTS MAC" Sep. 1999 IEEE, pp. 781–786.
"Universal Mobile Telecommunciatons System (UMTS); Physical Lay Procedures (FDD)" Sep. 2000, 3GPP, pp. 1–47.

* cited by examiner

Primary Examiner—Douglas Olms
Assistant Examiner—Robert W. Wilson
(74) Attorney, Agent, or Firm—Volpe and Koenig, P.C.

(57) ABSTRACT

Sub-channels are defined for a physical random access channel of a wireless time division duplex communication system using code division multiple access. The sub-channels carry information between system users and a system network. A series of radio frames have a sequence of timeslots. For a particular timeslot number of the sequence, each sub-channel of the particular timeslot number is uniquely defined by one radio frame of the series.

20 Claims, 5 Drawing Sheets

FIG. 2 --PRIOR ART--

SUB-CHANNELS FOR THE RANDOM ACCESS CHANNEL IN TIME DIVISION DUPLEX

This application claims priority from U.S. Provisional Patent Application No. 60/256,621, filed on Dec. 19, 2000.

BACKGROUND

The invention generally relates to wireless time division duplex (TDD) communication systems using code division multiple access. In particular, the invention relates to sub-channels for the physical random access channel (PRACH) for such systems.

In code division multiple access (CDMA) communication systems using frequency division duplex (FDD), such as proposed for the third generation partnership project (3GPP), physical random access channels (PRACHs) are used for transmitting infrequent data packets and system control information from the user equipments (UEs) or users to the Node-B.

In a 3GPP FDD/CDMA system, the PRACH is divided into ten (10) millisecond radio frames $22_1$ to $22_8$ (22) having fifteen (15) timeslots 24, as shown in FIG. 1. The radio frames 22 are sequentially numbered, such as numbered from 0 to 255, as a system frame number. The system frame numbers are sequentially repeated. The random access transmission starts at the beginning of a number of well-defined time intervals, denoted access slots 26. The random access transmissions $28_1$ to $28_5$ (28) from the users are begun in a particular access slot 26 and continue for one or multiple slots 26. These transmissions are sent using a randomly selected signature associated with an access service class (ASC) assigned by a radio resource controller of the network to the user.

The PRACH is used for infrequent data packets and system control information and the network uses sub-channels of the PRACH for further separation of UEs and access service classes. In the 3GPP FDD/CDMA system, each sub-channel is associated with a subset of the total uplink access slots 26, described as follows.

Two sequential radio frames 22 are combined into one access frame 20. The access frame is divided into 15 access slots 26. Each access slot 26 has a duration of two radio frame timeslots 24 as shown in FIG. 1. The duration of a radio frame 22 is shown in FIG. 1 by the dual headed arrows. The sub-channels are assigned to the access slots 26 by sequentially numbering the slots from 0 to 11, as shown in FIG. 1. After sub-channel 11 is assigned, the next access slot 26 is numbered 0 and the numbering is repeated. The access slot 26 to sub-channel numbering is repeated every 8 radio frames or 80 milliseconds (ms). This repetition can be viewed as a modulo (mod) 8 counting of the radio frame numbers.

In 3GPP FDD/CDMA, multiple PRACHs are used. Each PRACH is uniquely associated with a random access channel (RACH) transport channel and is also associated with a unique combination of preamble scrambling code, available preamble signatures and available sub-channels.

FIG. 2 is one example of an illustration of such an association. RACH 0 $30_0$ is paired with PRACH 0 $32_0$ through a coding block $31_0$. The data received over PRACH 0 $32_0$ is recovered using the preamble scrambling code 0 $34_0$ and the appropriate preamble signature 38 that the data was sent.

PRACH 0 $32_0$ is uniquely associated with preamble scrambling code 0 $34_0$ and has three access service classes (ASCs), ASC0 $40_0$, ASC1 $40_1$ and ASC2 $40_2$. Although the number of ASCs shown in this example are three, the maximum number of ASCs is eight (8). Each ASC 40 has a number of available sub-channels, available preamble signatures and a persistence factor. The persistence factor represents the persistence in retransmitting the preamble signature after a failed access attempt. In 3GPP FDD/CDMA, the maximum available sub-channels 36 is 12 and the maximum available preamble signatures 38 is 16.

RACH 1 $30_1$ is paired with PRACH 1 $32_1$. PRACH 1 $32_1$ is uniquely associated with preamble scrambling code 1 $34_1$ and its sub-channels 36 and preamble signatures 38 are partitioned into four ASCs 40, ASC0 $40_3$, ASC1 $40_4$, ASC2 $40_5$ and ASC3 $40_6$. RACH 2 $30_2$ is paired with PRACH 2 $32_2$. PRACH 2 $32_2$ uses preamble scrambling code 2 $34_2$, which is also used by PRACH 3 $32_3$. Three ASCs 40 are available for PRACH 2 $32_2$, ASC0 $40_7$, ASC1 $40_8$ and ASC2 $40_9$. Because PRACH 2 and PRACH 3 share the preamble scrambling code, a group of partitioned off available sub-channels/available preamble signature combinations are not used for PRACH 2 $32_2$. The partitioned off area is used by PRACH 3 $32_3$.

RACH 3 $30_3$ is paired with PRACH 3 $32_3$. PRACH 3 $32_3$ also uses preamble scrambling code 2 $34_2$ and uses ASC0 $40_{10}$ and ASC1 $40_{11}$. ASC0 $40_{10}$ and ASC1 $40_{11}$ contain the available sub-channel/signature set not used by PRACH 2 $32_3$.

Since each PRACH ASC 40 is uniquely associated with a preamble scrambling code 34 and available preamble signatures set and sub-channels, the Node-B can determine which PRACH 32 and ASC 40 is associated with received PRACH data. As a result, the received PRACH data is sent to the appropriate RACH transport channel. Although each PRACH 32 is illustrated in this example by having the ASCs 40 partitioned by available preamble signatures, the partitions may also be by sub-channel 36.

Another communication system proposed to use PRACHs is a CDMA system using time division duplex (TDD), such as the proposed 3GPP TDD/CDMA system. In TDD, radio frames are divided into timeslots used for transferring user data. Each timeslot is used to transfer only uplink or downlink data. By contrast, an FDD/CDMA system divides the uplink and downlink by frequency spectrum. Although the air interface, physical layer, between FDD and TDD systems are quite different, it is desirable to have similarities between the two systems to reduce the complexity at the network layers, such as layer 2 and 3.

Accordingly, it is desirable to have sub-channels for the RACH for TDD.

SUMMARY

Sub-channels are defined for a physical random access channel of a wireless time division duplex communication system using code division multiple access. A series of radio frames have a sequence of timeslots. For a particular timeslot number of the sequence, each sub-channel of the particular timeslot number is uniquely defined by one radio frame of the series.

BRIEF DESCRIPTION OF THE DRAWING(S)

DETAILED DESCRIPTION OF THE PREFERRED EMBODIMENT(S)

Although the following discussion uses a 3GPP system for illustration, sub-channels for a TDD PRACH is applicable to other systems.

Figure 3:
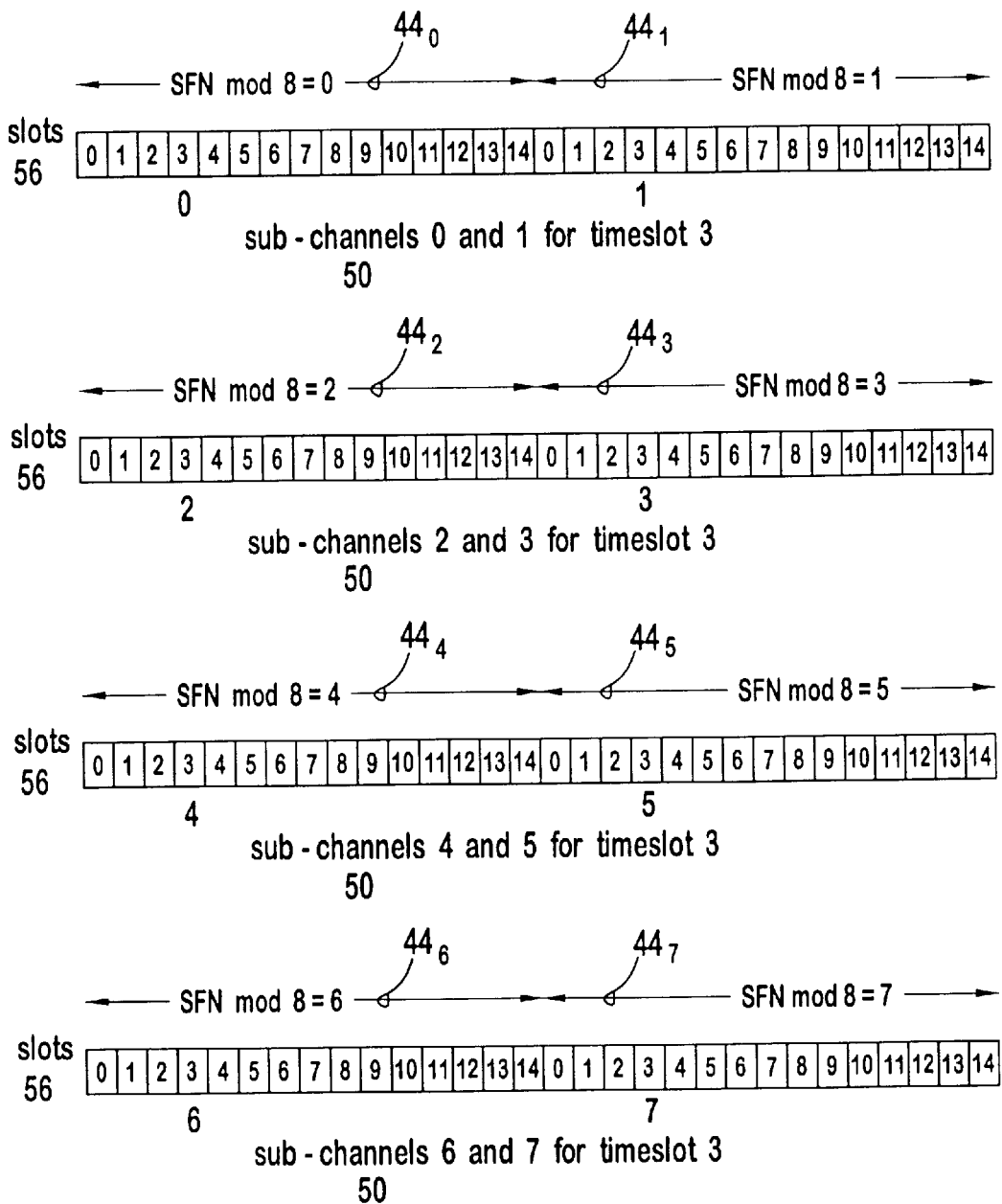
FIG. 3 is an illustration of sub-channels in a time division duplex (TDD)/CDMA system.
Figure 4:
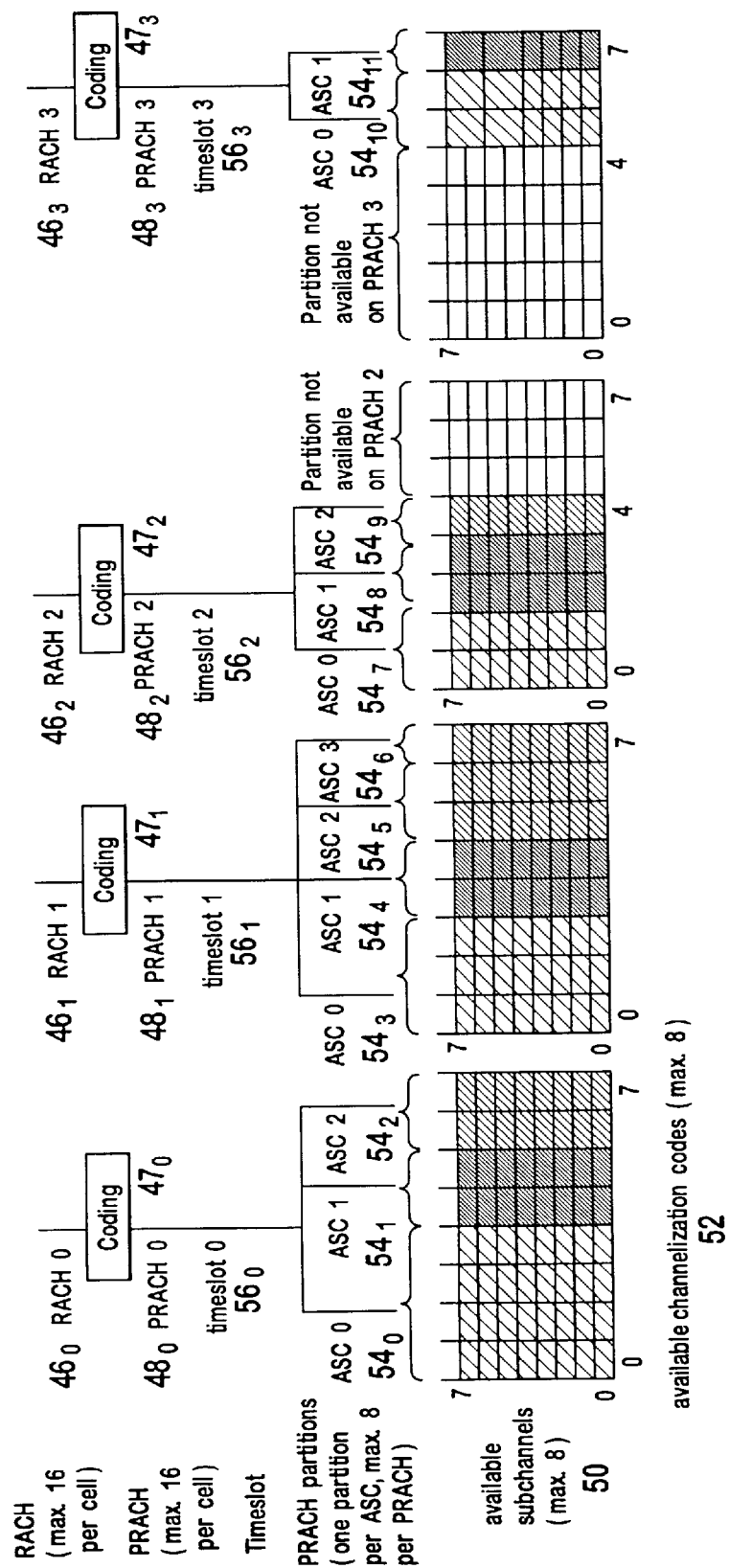
FIG. 4 is an illustration of PRACH configurations in a TDD/CDMA system.

FIG. 3 illustrates a preferred implementation of sub-channels for timeslot 3 for PRACHs of a TDD/CDMA system. Each PRACH 48 is associated with one timeslot number 56 and a set of sub-channels 50 and channelization codes 52, as shown in FIG. 4. For a particular timeslot number 56, a sub-channel 50 is uniquely associated with a radio frame 44, as shown by double ended arrows. In a preferred implementation, such as shown in FIG. 3, each sub-channel 50 is sequentially assigned to sequential radio frames 44. To illustrate, sub-channel 0 is associated with a timeslot number of a $j^{th}$ radio frame, such as radio frame 0 of FIG. 4. Sub-channel 1 is associated with the same timeslot number of the next $(j+1^{th})$ radio frame, such as radio frame 1.

After n radio frames, the next n frames are assigned the same sub-channels 50. For instance, sub-channel 0 is assigned to radio frame n+j, such as radio frame n. For a particular timeslot 56, the sub-channels 50 are assigned based on the system frame number, which is a series of repeating radio frames. A preferred scheme uses a modulo function of the system frame number (SFN) for n sub-channels. For sub-channel i, Equation 1 is used.

SFN mod n=i       Equation 1 mod n is a modulo n function. One illustration uses a modulo 8 function, such as per Equation 2.

SFN mod 8=i       Equation 2

As a result, as shown in FIG. 3, in a first frame $44_0$ in timeslot 3, sub-channel 0 is assigned. In a second frame $44_1$, sub-channel 1 is assigned and so on until an eighth frame $44_7$ where sub-channel 7 is assigned. Preferably, the number of sub-channels is 8, 4, 2 or 1. Although FIG. 3 only illustrates sub-channel assignments for timeslot 3, the same scheme is used on any timeslot number. In a FDD/CDMA system, each PRACH 32 is associated with a unique combination of preamble scrambling code 34, available sub-channels 36 and available preamble signatures 38. One example of a potential implementation of 4 PRACHs is shown in FIG. 4.

In an analogous manner, each PRACH 48 in a TDD system is preferably associated with a unique combination of timeslot 56, available channelization codes 50 (preferred a maximum of 8) and available sub-channels 52 (preferred maximum of 8) as shown in FIG. 4. The channelization codes 52 are used by the users to transmit the uplink data. Similar to FDD, each TDD PRACH 48 is paired with a RACH 46 transport channel via a coding block 47. FIG. 4 illustrates a general configuration for the PRACHs 48. Each PRACH 48 is associated with a timeslot 56 and a set of available sub-channels 50 and available channelization codes 52. As shown in FIG. 4, each PRACH 48 in a particular timeslot is assigned exclusive channelization codes 52. This allows the base station PRACH receiver to distinguish between the different PRACHs 48 by knowing the channelization codes 52 used to recover the received PRACH data.

ASCs 54 are preferably formed by partitioning a particular PRACH's available sub-channels 50 and channelization codes 52. Typically, a limit is set for the number of ASCs 54, such as eight (8). RACH 0 $46_0$ receives data over PRACH 0 $48_0$ by decoding data transmitted in timeslot 0 $56_0$ with the appropriate channelization codes of PRACH 0 $48_0$. The available sub-channels 50 and channelization codes 52 are partitioned into three ASCs 54, ASC0 $54_0$, ASC1 $54_1$ and ASC2 $54_2$. As shown, each partition is set by channelization codes 52, although, in another implementation, the partitions may be by sub-channels 36 or a unique set of channelization code/sub-channel combinations. As a result in the present example, each ASC 54 has a unique set of channelization codes 52 for that PRACH 48. The ASC 54 associated with received PRACH data is determined using the channelization code 52 used to recover the received PRACH data.

RACH 1 $46_1$ receives data over PRACH 1 $48_1$ by decoding data transmitted in timeslot 1 $56_1$ using PRACH 1's channelization codes 52. The available sub-channels 50 and channelization codes 52 are partitioned into four ASCs 54, ASC0 $54_3$, ASC1 $54_4$, ASC2 $54_5$ and ASC3 $54_6$.

RACH 2 $46_2$ receives data over PRACH 2 $48_2$ by decoding data transmitted in timeslot 2 $56_2$ using PRACH 2's channelization codes 52. The available sub-channels 50 and channelization codes 52 are partitioned into three ASCs 54, ASC0 $54_7$, ASC1 $54_8$ and ASC2 $54_9$, and an unavailable partition used for PRACH 3 $48_3$. RACH 3 $46_3$ receives data over PRACH 3 $48_3$ by decoding data transmitted in timeslot 2 $56_2$ using PRACH 3's channelization codes 52. The available sub-channels 50 and channelization codes 52 for timeslot 2 $56_2$ are partitioned into two ASCs 54, ASC0 $54_{10}$ and ASC1 $54_{11}$ and an unavailable partition used by PRACH 2 $48_2$. As shown in FIG. 4, timeslot 2 $56_2$ is effectively divided into two PRACHs 48, PRACH 2 $48_2$ and 3 $48_3$, by channelization codes 52. As a result in this example, data received in timeslot 2 $56_2$ is sent to the appropriate PRACH 48 based on the channelization codes used to transmit the data. Alternately in another implementation, the partition may be by sub-channels 36 or channelization code/sub-channel combinations.

Figure 1:
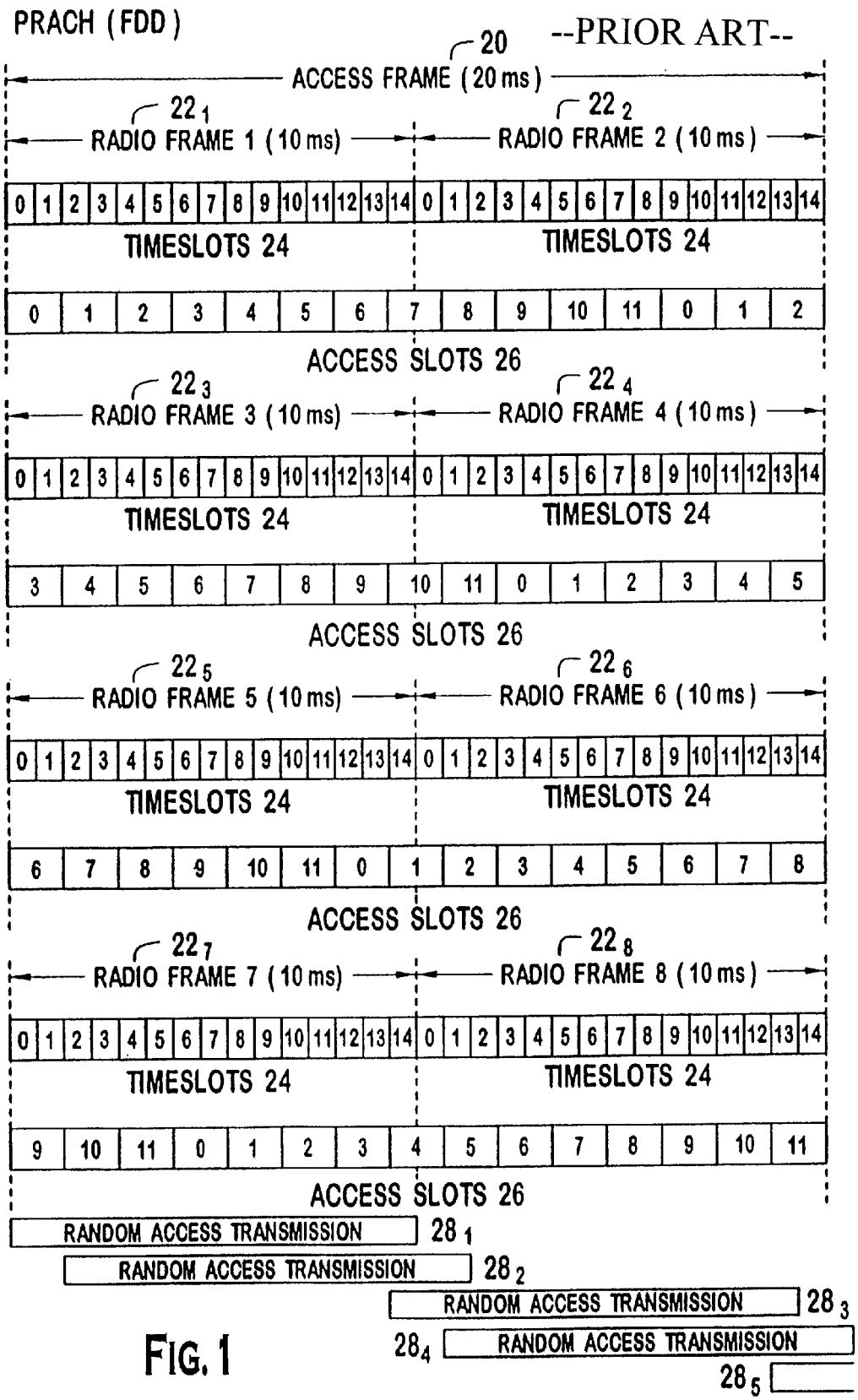
FIG. 1 is an illustration of access slots and sub-channels for a FDD/CDMA system.
Figure 2:
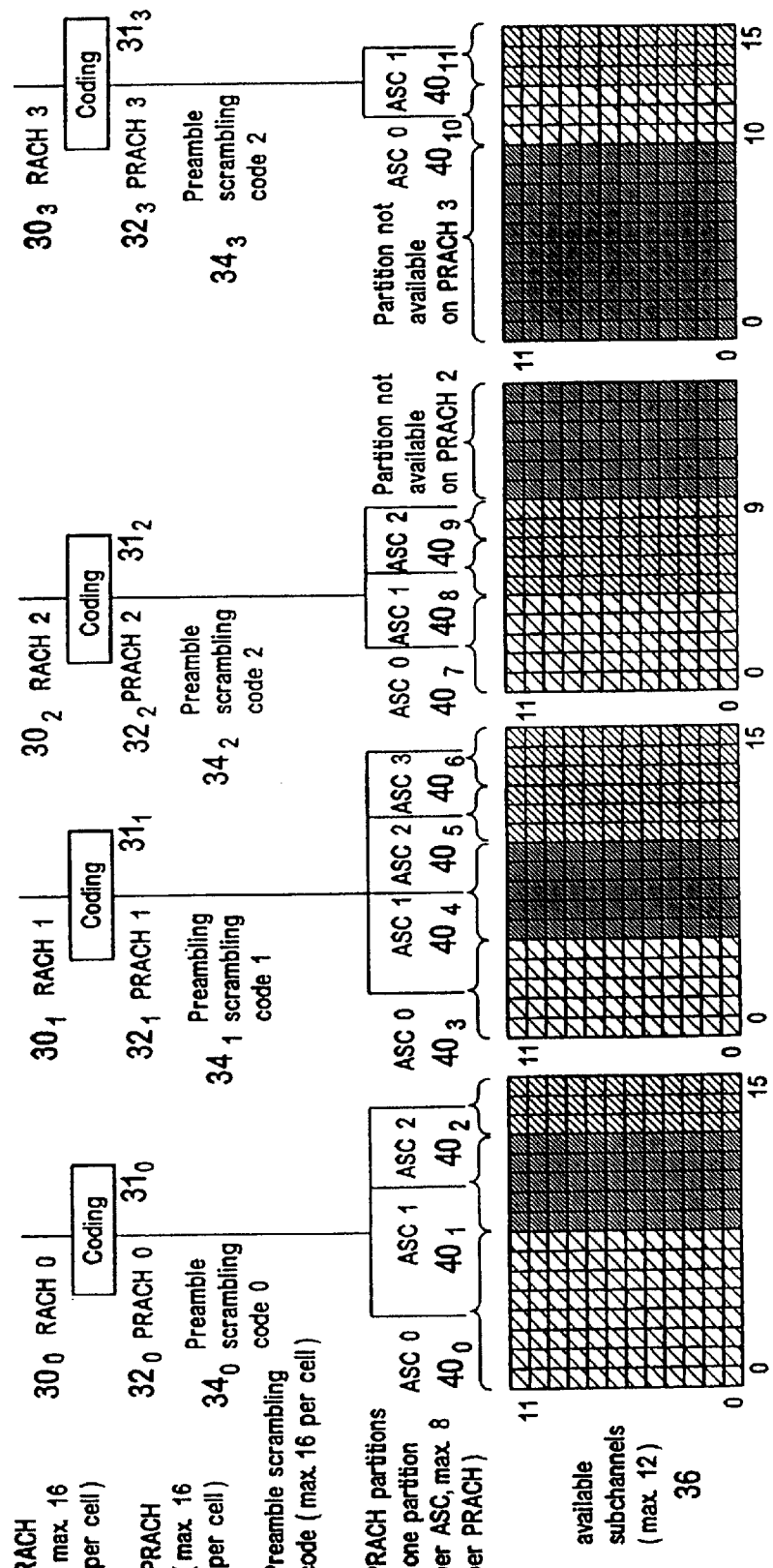
FIG. 2 is an illustration of PRACH configurations in a FDD/CDMA system.

As shown in the PRACH implementation of FIG. 4, the example of the TDD PRACH configuration is analogous to the example FDD PRACH configuration of FIG. 2. In TDD, each PRACH is associated with a timeslot 56. In FDD, each PRACH is associated with a preamble scrambling code 34. TDD ASCs 54 are preferably partitioned by available channelization codes 52 and FDD ASCs 40 by available preamble signatures 38. These similarities for these examples allow for the higher layers to operate similarly between TDD and FDD.

Figure 5:
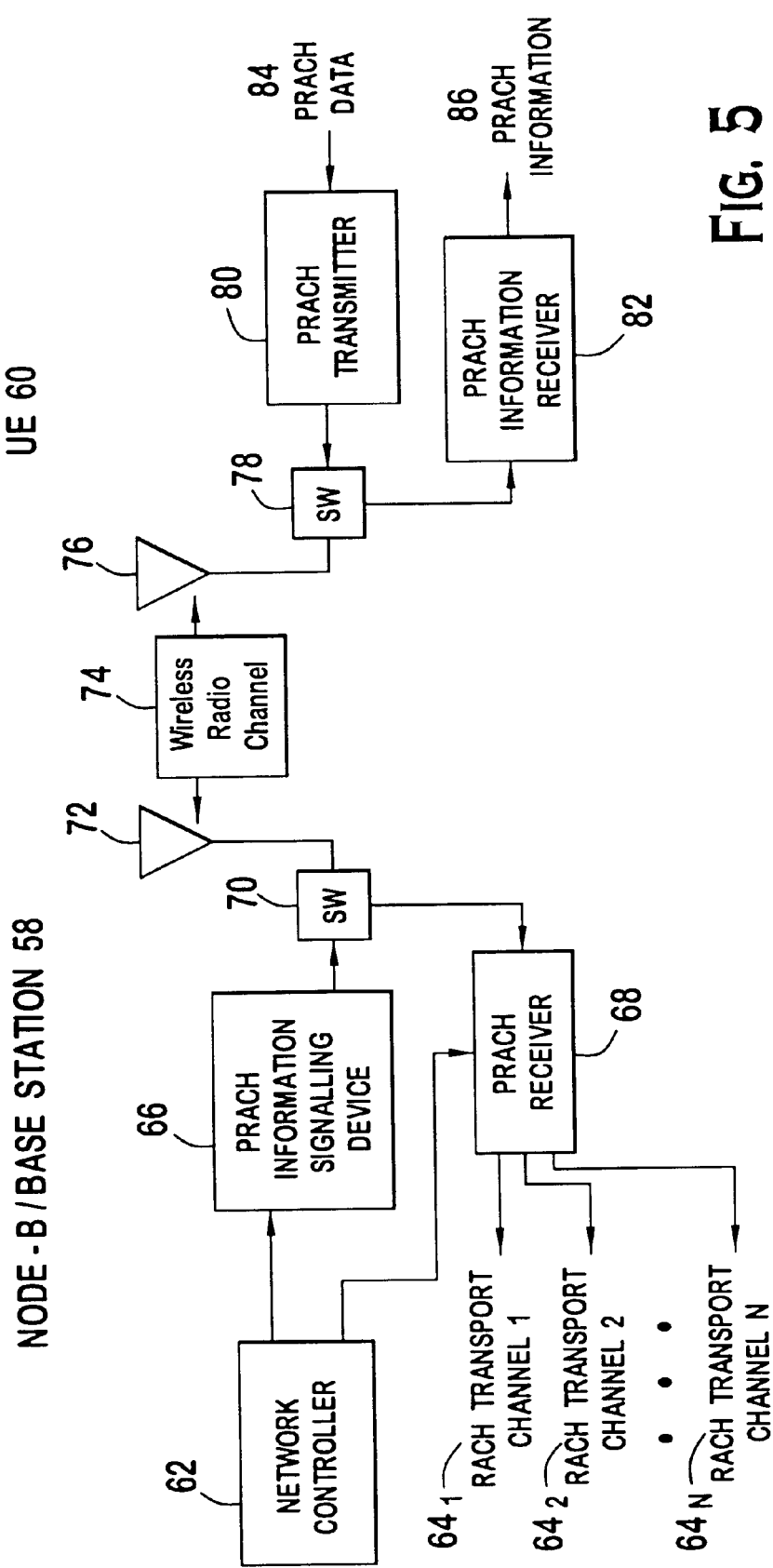
FIG. 5 is a simplified diagram of a Node-B/base station and a user equipment using a TDD/CDMA PRACH.

FIG. 5 is a simplified block diagram of a TDD PRACH system. For use in sending PRACH information, such as an assigned PRACH and ASC, to the UE 60 from the network controller 62 via the Node-B/base station 58, a PRACH information signaling device 66 is used. The PRACH information signal passes through a switch 70 or isolator and is radiated by an antenna 72 or an antenna array through a wireless radio channel 74. The radiated signal is received by an antenna 76 at the UE 60. The received signal is passed through a switch 78 or isolator to a PRACH information receiver 82.

To send data over the PRACH from the UE 60 to the base station 58, a PRACH transmitter 80 spreads the PRACH data 84 with one of the available codes for the PRACH assigned to the UE 60 and time multiplexes the spread data with the timeslot of that PRACH. The spread data is passed through a switch 78 or isolator and radiated by an antenna 76 through a wireless radio interface 74. An antenna 72 or antenna array at the base station 58 receives the radiated signal. The received signal is passed through a switch 70 or isolator to a PRACH receiver 68. The PRACH data 84 is recovered by the PRACH receiver 68 using the code used to spread the PRACH data 84. The recovered PRACH data 84 is sent to the RACH transport channel $64_1$–$64_N$ associated with that PRACH. The network controller 62 provides PRACH information to the PRACH receiver 68 for use in recovering the PRACH data 84.

What is claimed is:

1. A method for defining sub-channels for a physical random access channels of a wireless time division duplex communication system using code division multiple access, the sub-channels are used by the system to separate different access service classes, the method comprising:

provoding a series of radio frames having a sequence of timeslots;

for a particular timeslot number of the sequence, uniquely defining each sub-channel of the particular timeslot number by one radio frame of the series.

2. The method of claim 1 wherein a number of the sub-channels is N.

3. The method of claim 2 wherein values for N include 1, 2, 4 and 8.

4. The method of claim 2 wherein each radio frame has a system frame number.

5. The method of claim 3 wherein each sub-channel is assigned to its one radio frame by a modulo N counting of the system frame number.

6. A physical random access channel (PRACH) of a wireless time division duplex communication system using code division multiple access, the PRACH comprising:

a timeslot number of a sequence of timeslots uniquely associated with the PRACH; and at least one sub-channel, the sub-channel uniquely defined by one radio frame of a series of radio frames and the sub-channel associated with the timeslot number.

7. The PRACH of claim 6 wherein a number of the at least one sub-channel is N.

8. The PRACH of claim 7 wherein values for N include 1, 2, 4 and 8.

9. The PRACH of claim 7 wherein each radio frame has a system frame number.

10. The PRACH of claim 9 wherein each sub-channel is assigned to its one radio frame by a modulo N counting of the system frame number.

11. A wireless time division duplex communication system using code division multiple access, the system comprising:

a network controller for separating user equipments by sub-channels of physical random access channels (PRACHs), the sub-channels uniquely defined by one radio frame of a series of radio frames and the sub-channel associated with a timeslot number of a sequence of timeslots in each radio frame.

12. The system of claim 11 further comprising a base station for signaling access service class (ASC) information to user equipments, each access service class associated with a subset of the sub-channels.

13. The system of claim 12 further comprising the user equipments for receiving the signaled ASC information.

14. The system of claim 13 wherein the user equipments uses the ASC information for PRACH transmissions.

15. The system of claim 14 wherein the ASC information indicates channelization codes for the PRACH transmissions.

16. The system of claim 11 wherein a number of sub-channels associated with one PRACH is N.

17. The system of claim 16 wherein values for N include 1, 2, 4 and 8.

18. The system of claim 17 wherein each radio frame has a system frame number.

19. The system of claim 18 wherein each sub-channel is assigned to its one radio frame by a modulo N counting of the system frame number.

20. The system of claim 16 wherein a number of the sub-channels is N.

* * * * *